(12) United States Patent
Fu et al.

(10) Patent No.: US 11,007,856 B1
(45) Date of Patent: May 18, 2021

(54) LOCKING DEVICE FOR CARRIAGE COVER

(71) Applicant: Hangzhou Golden Sun Auto Parts Co., Ltd., Hangzhou (CN)

(72) Inventors: Jinqin Fu, Hangzhou (CN); Shaoyong Zheng, Hangzhou (CN); Feng Wang, Hangzhou (CN); Chenshan Lin, Hangzhou (CN); Peng Cao, Hangzhou (CN); Xue'e Wang, Hangzhou (CN); Xiaohong Tang, Hangzhou (CN)

(73) Assignee: HANGZHOU GOLDEN SUN AUTO PARTS CO., LTD., Hangzhou (CN)

( * ) Notice: Subject to any disclaimer, the term of this patent is extended or adjusted under 35 U.S.C. 154(b) by 2 days.

(21) Appl. No.: 16/742,638

(22) Filed: Jan. 14, 2020

(30) Foreign Application Priority Data

Nov. 13, 2019 (CN) .......................... 201911106439.1

(51) Int. Cl.
*B60J 7/19* (2006.01)
*B60J 7/16* (2006.01)

(52) U.S. Cl.
CPC ............. *B60J 7/198* (2013.01); *B60J 7/1607* (2013.01)

(58) Field of Classification Search
CPC ... B60J 7/041; B60J 7/062; B60J 7/141; B60J 7/1607; B60J 7/1628; B60J 7/1635; B60J 7/185; B60J 7/1858; B60J 7/19; B60J 7/198

USPC ........................................ 296/100.01, 100.04
See application file for complete search history.

(56) References Cited

U.S. PATENT DOCUMENTS

| | | | |
|---|---|---|---|
| 8,714,622 B2* | 5/2014 | Spencer ................... | B60J 7/085 296/100.18 |
| 10,189,340 B2* | 1/2019 | Schmeichel ............ | B60J 7/141 |
| 10,800,234 B2* | 10/2020 | Dylewski, II ........... | B60J 7/141 |
| 2012/0187713 A1* | 7/2012 | Williamson ............. | B60J 7/104 296/100.01 |
| 2017/0240033 A1* | 8/2017 | Dylewski, II ............ | B60P 7/02 |

\* cited by examiner

*Primary Examiner* — Jason S Daniels
(74) *Attorney, Agent, or Firm* — Muncy, Geissler, Olds and Lowe, P.C.

(57) ABSTRACT

A locking device for a carriage cover includes a limit locking clamp assembly and a lock catch assembly, wherein the limit locking clamp assembly is detachably disposed at the carriage of the vehicle body and is provided with a limit step and a limit protrusion disposed at the lower surface of the limit step; and the lock catch assembly is disposed at the carriage cover and is provided with a lock bolt and a limit groove formed in the lock bolt, the lock bolt is clamped into the limit step, and the limit protrusion is clamped into the limit groove to connect the lock catch assembly to the limit locking clamp assembly, so that the carriage cover is mounted on the carriage. The carriage cover is reliably connected to the vehicle body and is not prone to getting loose or moving.

10 Claims, 6 Drawing Sheets

LOCKING DEVICE FOR CARRIAGE COVER

CROSS-REFERENCE TO RELATED APPLICATIONS

This Non-provisional application claims priority under 35 U.S.C. § 119(a) on Chinese Patent Application No(s). 201911106439.1 filed on Nov. 13, 2019, the entire contents of which are hereby incorporated by reference.

BACKGROUND OF THE INVENTION

Technical Field

The invention relates to a field of manufacturing of automobile parts, in particular to a locking device for a carriage cover.

Description of Related Art

Vehicles having open carriages, such as pickup trucks having a front car cab and an open carriage, are correspondingly equipped with carriage covers to shield and protect goods in the carriage against damage caused by exposure to the sun and rain. The pickup trucks are attractive in appearance, as comfortable as cars, strong in power, low in price and capable of carrying both people and goods, thereby being popular with the mass consumers. However, goods in the open carriage of the pickup trucks are exposed to the sun and rain and thus may be damaged. A triple-fold cover or a folding hood with a shielding function is generally assembled on the open carriage of existing pickup trucks. However, due to the fact that the triple-fold covers on the current market is usually fixed to a vehicle body with nuts, mounting is complex, and the triple-fold cover may get loose due to shaking of the vehicle body during driving and may move under the inertia effect when the vehicle accelerates or brakes.

SUMMARY OF THE INVENTION

In view of the above problems, the present invention provides a locking device for a carriage cover which has a reasonable design, a reliable connection between the carriage cover and a vehicle body is provided, therefore, it is not easy to loosen, and it is not easy to move.

The technical scheme adopted by the present invention is as follows:

The invention provides a locking device for a carriage cover. The locking device is used for mounting the carriage cover on a carriage of a vehicle body and the locking device includes:

a limit locking clamp assembly detachably disposed at the carriage of the vehicle body, wherein the limit locking clamp assembly is provided with a limit step, and a limit protrusion disposed at a lower surface of the limit step; and a lock catch assembly disposed at the carriage cover, wherein the lock catch assembly is provided with a lock bolt, a limit groove is disposed at the lock bolt, wherein the lock bolt is clamped into the limit step, and the limit protrusion is clamped into the limit groove, so that the lock catch assembly and the limit locking clamp assembly are connected, and then the carriage cover is mounted at the carriage.

In one embodiment of the present invention, the lock catch assembly may include a guide rail structure and lock bolt structures, wherein the guide rail structure may include a limit plug and a first guide rail, the limit plug may be disposed at the carriage cover and the limit plug corresponds to the limit locking clamp assembly, and the first guide rail has an end connected with the limit plug so as to be limited; each lock bolt structure may include a positioning block and a lock bolt, the positioning block may be fixed at the first guide rail, the lock bolt may be slidably disposed at the positioning block, and the lock bolt may be able to move back and forth along the first guide rail to be clamped into or disengaged from the limit step.

In one embodiment of the present invention, the limit plug may be provided with a plurality of insertion ends, an end of the first guide rail may be provided with a plurality of insertion holes corresponding to the insertion ends, the insertion ends may be inserted into the insertion holes to connect the limit plug to the first guide rail, The carriage cover may be provided with a carriage cover sideboard, an H-shaped insertion groove may be disposed at the carriage cover sideboard, the limit plug may be provided with an H-shaped insertion end, the H-shaped insertion end inserted into the H-shaped insertion groove The lock bolt may be provided with a lock block, a limit groove may be defined by a plurality of insertion ends, and when the lock bolt may be clamped into the limit step, the lock block may be inserted into the limit groove.

In one embodiment of the present invention, each lock bolt structure further may include a spring, the lock bolt may be provided with a receiving groove, the positioning block may be provided with a limit column, the spring may be disposed into the receiving groove and the limit column may be inserted into the spring. Two ends of the spring respectively abut against the positioning block and the lock bolt. A second guide rail may be disposed at a side edge of the lock bolt, the positioning block may be provided with a C-shaped groove matched with the second guide rail, and the second guide rail may be able to slide in the C-shaped groove to allow the lock bolt to be slidably disposed at the positioning block.

In one embodiment of the present invention, each lock bolt structure further may include a handle connection block, the handle connection block may be provided with a pull head, the lock bolt may be provided with a slot, and the pull head may be clamped into the slot to connect the handle connection block with the lock bolt. Handles may be disposed at both of the handle connection block and the lock bolt, so that a force can be conveniently applied by hand.

In one embodiment of the present invention, the number of the lock tongue structures may be two, and the two lock bolt structures respectively lock two sides of the carriage cover. The two lock bolt structures may be linked through a steel wire rope, and two ends of the steel wire rope may be respectively fixed to the two handle connection blocks.

In one embodiment of the present invention, the carriage may be provided with a carriage sideboard. The limit locking clamp assembly may include a first clamping plate, a second clamping plate, a first clamping member, and a second clamping member, wherein the first clamping plate and the second clamping plate may be respectively fastened on two side faces of the carriage sideboard through the first clamping member. The second clamping plate may be provided with a through hole, and the second clamping member penetrates through the through hole and abuts against the first clamping plate to fix the first clamping plate and the second clamping plate in the vertical direction. The limit step may be located at the second clamping plate.

In one embodiment of the present invention, anti-slip teeth may be disposed at clamping faces of the first clamping plate and the second clamping plate and the clamping faces may be in contact with the carriage sideboard.

In one embodiment of the present invention, the carriage sideboard may be provided with a first bent part, the first bent part may be bent upwards. The first clamping plate may be provided with a second bent part, and the second bent part may be bent downwards. The first bent part may be matched with the second bent part to limit the first clamping plate in the vertical direction.

In one embodiment of the present invention, an arc-shaped guide face may be disposed at an end of each lock bolt, the end of each lock bolt may be close to the limit step. An arc-shaped stop edge may be disposed at an edge of the limit step, the edge of the limit step may be close to each lock bolt. The guide face may be matched with the stop edge to clamp the lock bolt into the limit step.

The beneficial effect of the present invention is that the present invention provides a locking device for a carriage cover. The limit locking clamp assembly and the lock catch assembly are clamped to mount the carriage cover at the carriage of the vehicle body, so that the mounting manner is simple; the limit locking clamp assembly is disposed at the carriage of the vehicle body, the lock catch assembly is disposed at the carriage cover, and the lock bolt of the lock catch assembly is clamped into the limit step of the limit locking clamp assembly to limit a position of the carriage cover in a vertical direction; when the lock bolt is clamped into the limit step, the limit protrusion on the lower surface of the limit step is clamped into the limit groove of the lock bolt to limit the position of the carriage cover in a horizontal direction; in this way, the carriage cover will not get loose when the vehicle body shakes during traveling and will not move under a inertia effect when the vehicle accelerates or brakes.

Reference numbers: 101, carriage cover; 102, carriage sideboard; 1, limit locking clamp assembly; 11, first clamping plate; 12, second clamping plate; 13, first clamping member; 14, second clamping member; 111, second bent part; 121, limit step; 122, limit protrusion; 123, anti-slip tooth; 1021, first bent part; 1211, stop edge; 2, lock catch assembly; 21, guide rail structure; 22, lock bolt structure; 23, steel wire rope; 211, limit plug; 212, first guide rail; 221, positioning block; 222, lock bolt; 223, limit groove; 224, lock block; 225, spring; 226, handle connection block; 2111, insertion end; 2112, H-shaped insertion end; 2113, limit slot; 2211, limit column; 2212, C-shaped groove; 2121, insertion hole; 2122, guide rail pressing edge; 2221, receiving groove; 2222, second guide rail; 2223, slot; 2224, handle; 2225, guide face; 2226, limit block; 2261, pull head; 1011, carriage cover sideboard.

DETAILED DESCRIPTION OF THE INVENTION

The invention is completely described in detail below in combination with the accompanying drawings and specific embodiments.

Figure 1:
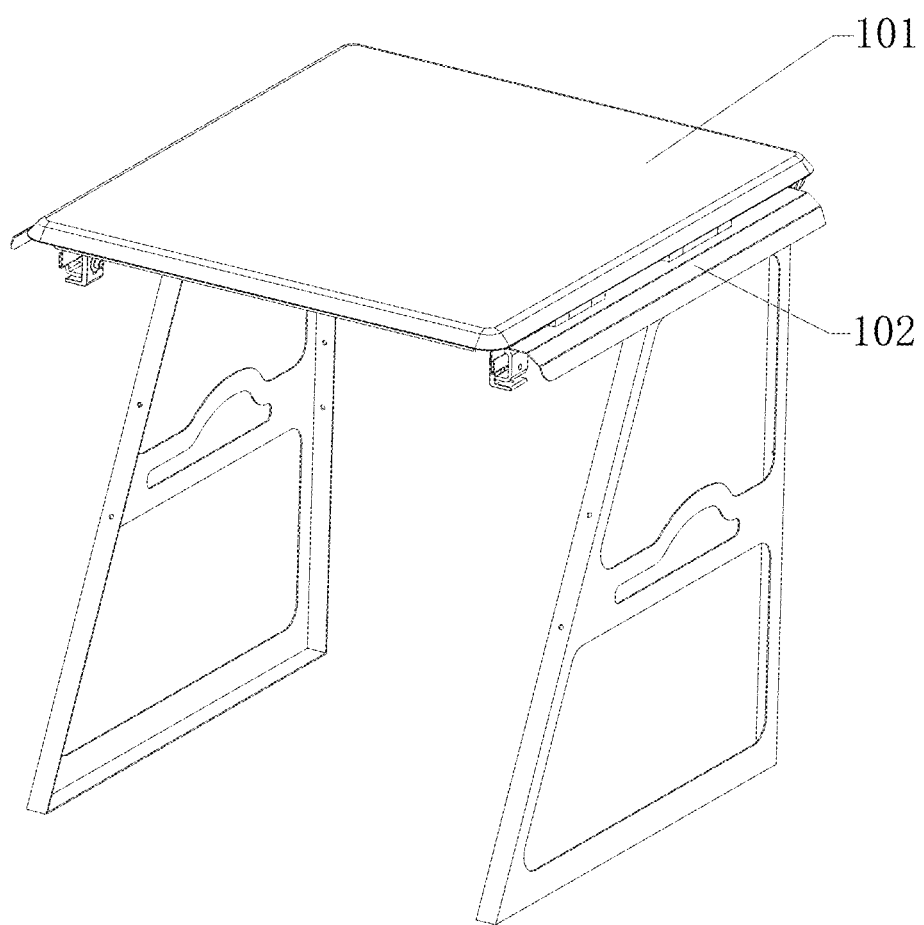
FIG. 1 is a first perspective structural view of a carriage cover mounted at a carriage through a locking device of the invention.
Figure 2:
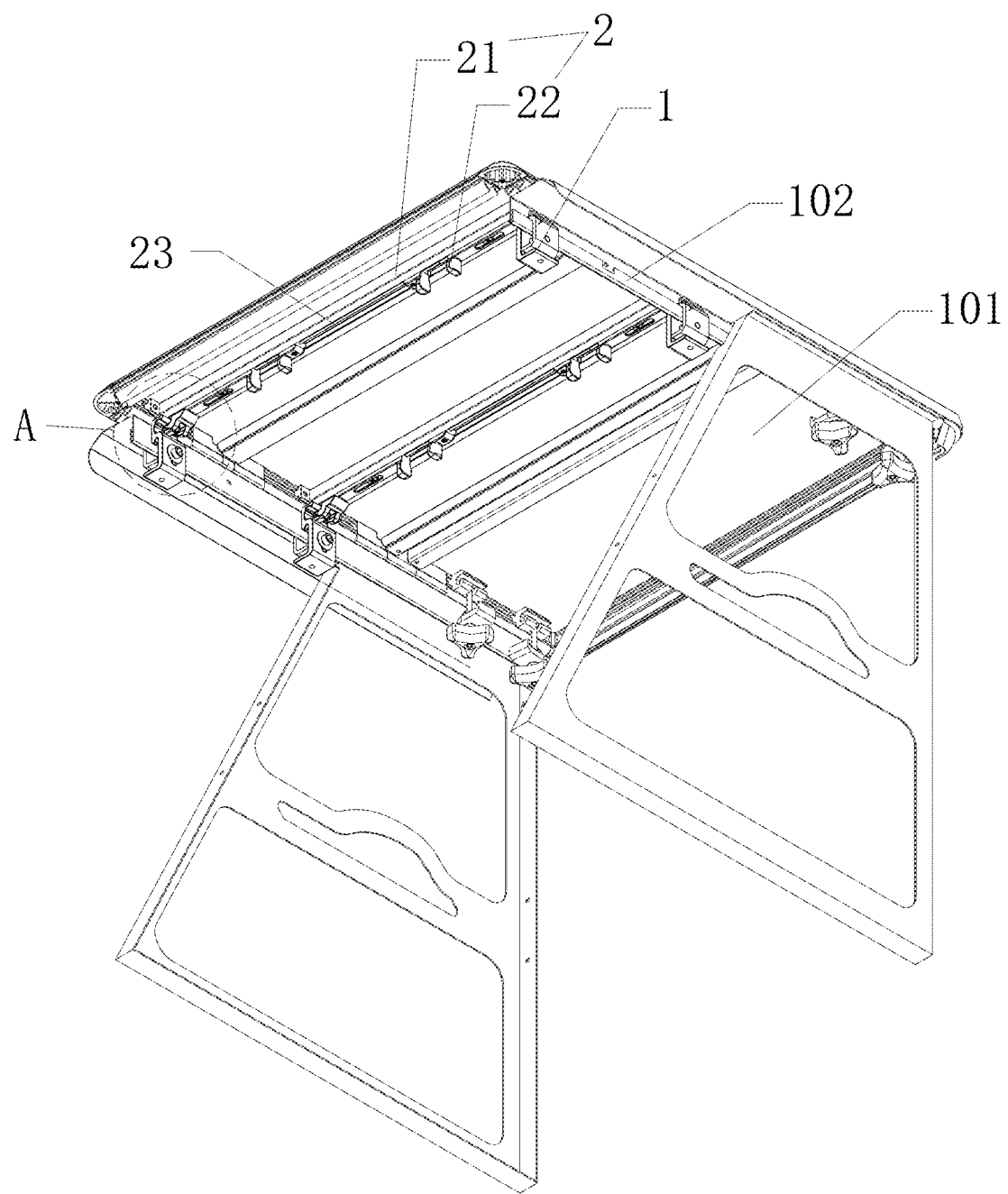
FIG. 2 is a second perspective structural view of the carriage cover mounted on the carriage through the locking device of the invention.
Figure 3:
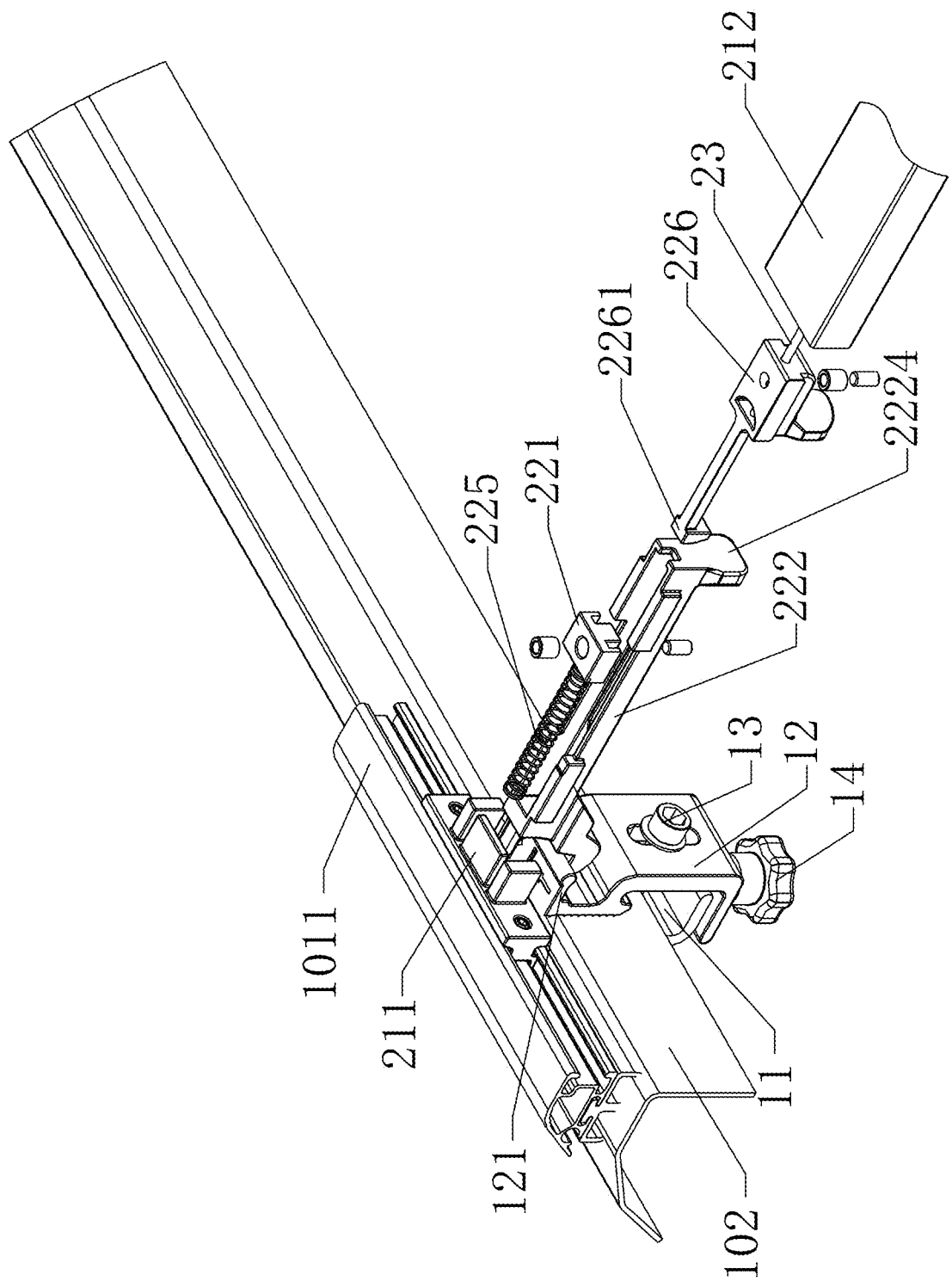
FIG. 3 is an internal structural view of the locking device of the invention.
Figure 4:
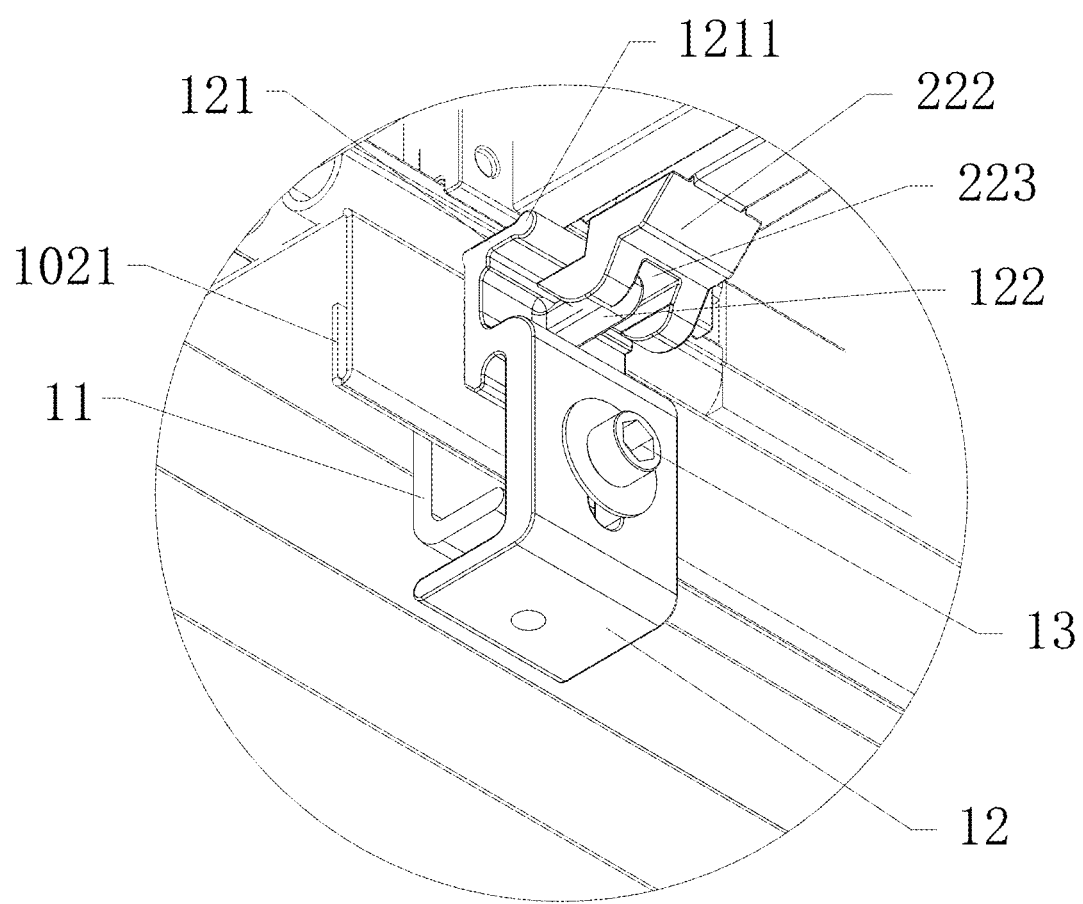
FIG. 4 is an enlarged view of part A in FIG. 2.
Figure 5:
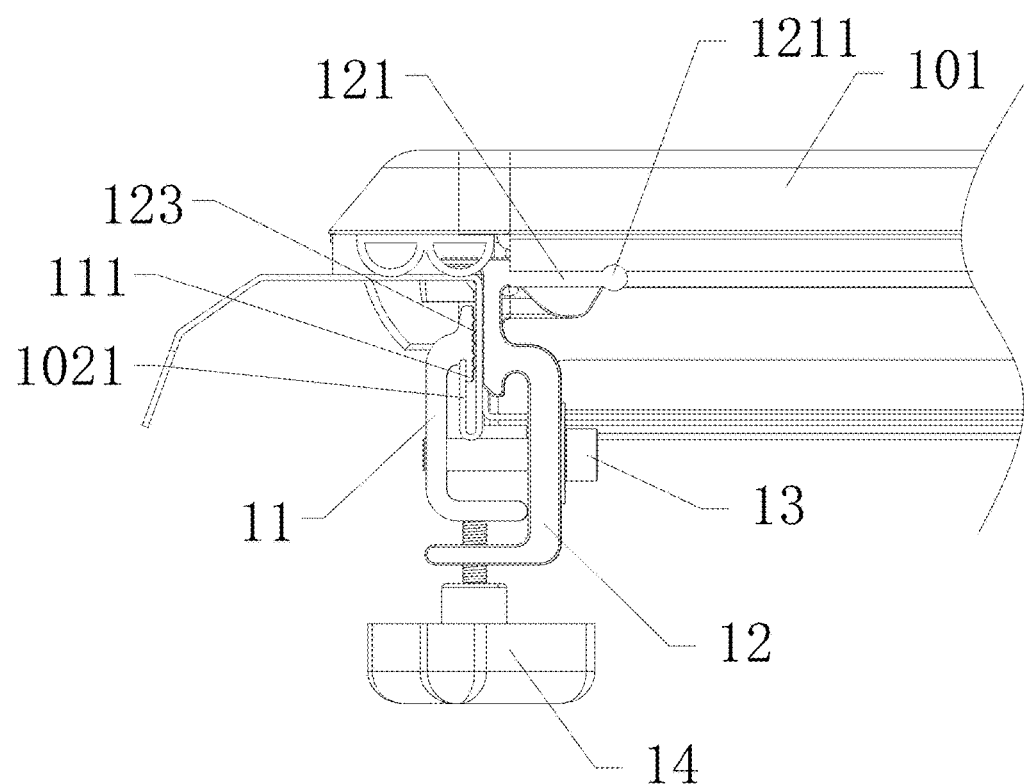
FIG. 5 is an assembly relation diagram of a limit locking clamp assembly and a carriage sideboard of the invention.
Figure 6:
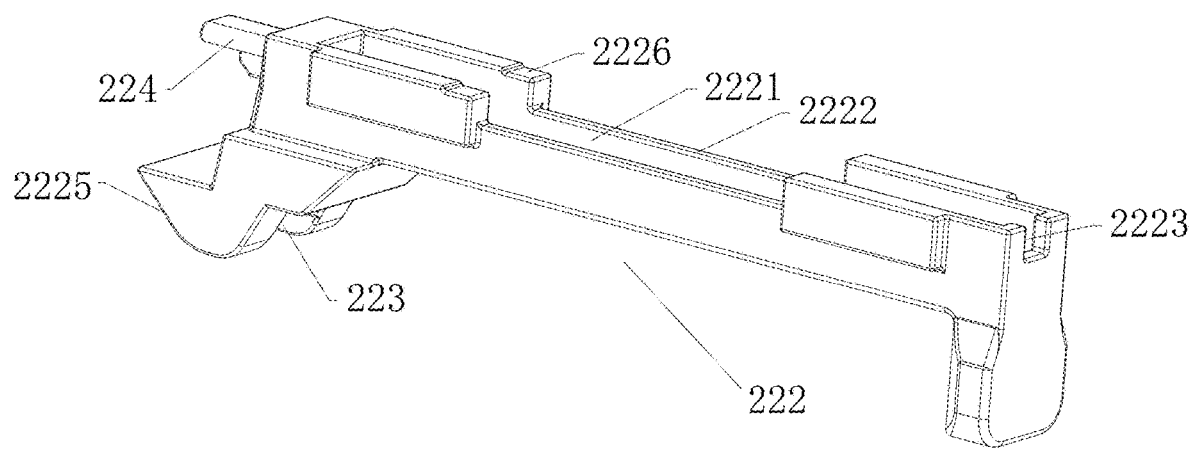
FIG. 6 is a structural view of a lock bolt of the invention.
Figure 7:
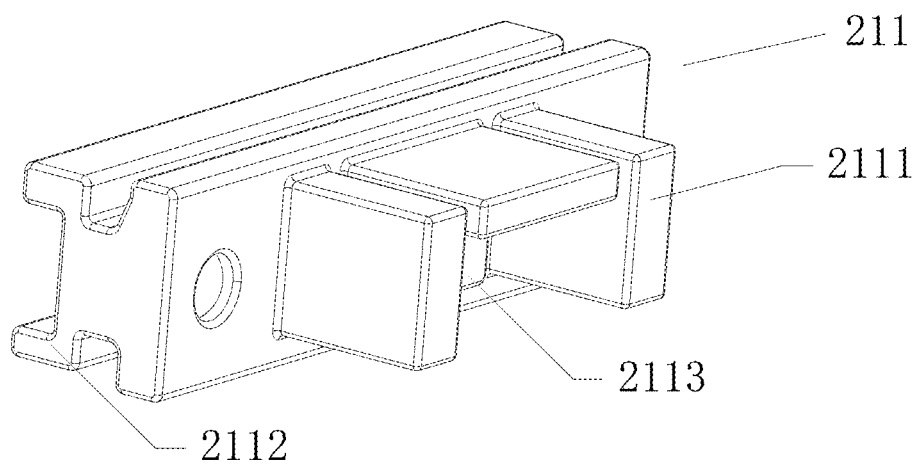
FIG. 7 is a structural view of a limit plug of the invention.
Figure 8:
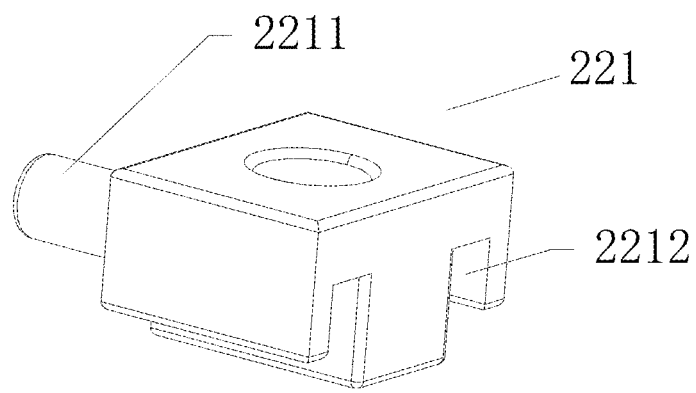
FIG. 8 is a structural view of a positioning block of the invention.
Figure 9:
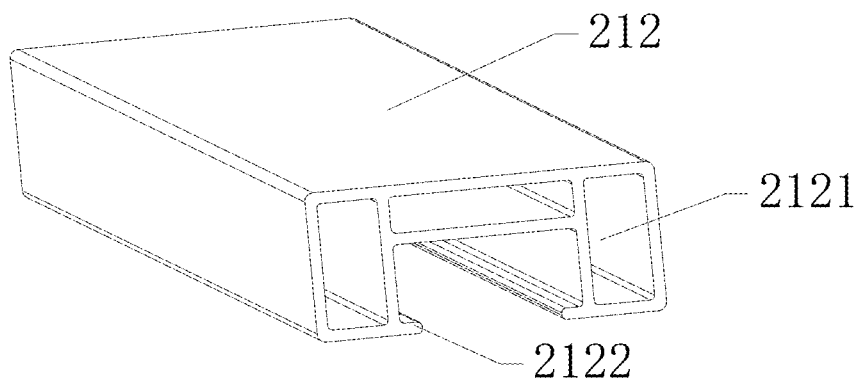
FIG. 9 is a structural view of a first guide rail of the invention.

Referring to FIG. 1-FIG. 9, the embodiment of the invention provides a locking device for a carriage cover 101. The locking device is used for mounting the carriage cover 101 on a carriage of a vehicle body and the locking device includes:

a limit locking clamp assembly 1 detachably disposed at the carriage of the vehicle body, wherein the limit locking clamp assembly 1 is provided with a limit step 121, and a limit protrusion 122 disposed at a lower surface of the limit step 121; and a lock catch assembly 2 disposed at the carriage cover 101, wherein the lock catch assembly 2 is provided with a lock bolt 222, a limit groove 223 is disposed at the lock bolt 222, wherein the lock bolt 222 is clamped into the limit step 121, and the limit protrusion 122 is clamped into the limit groove 223, so that the lock catch assembly 2 and the limit locking clamp assembly 1 are connected, and then the carriage cover 101 is mounted at the carriage.

The limit locking clamp assembly 1 and the lock catch assembly 2 are clamped to mount the carriage cover 101 at the carriage of the vehicle body, so that the mounting manner is simple; the limit locking clamp assembly 1 is disposed at the carriage of the vehicle body, the lock catch assembly 2 is disposed at the carriage cover 101, and the lock bolt 222 of the lock catch assembly 2 is clamped into the limit step 121 of the limit locking clamp assembly 1 to limit a position of the carriage cover 101 in a vertical direction; when the lock bolt 222 is clamped into the limit step 121, the limit protrusion 122 on the lower surface of the limit step 121 is clamped into the limit groove 223 of the lock bolt 222 to limit the position of the carriage cover 101 in a horizontal direction; in this way, the carriage cover 101 will not get loose when the vehicle body shakes during traveling and will not move under a inertia effect when the vehicle accelerates or brakes.

The lock catch assembly 2 includes a guide rail structure 21 and lock bolt structures 22, wherein the guide rail structure 21 includes a limit plug 211 and a first guide rail 212, the limit plug 211 is disposed at the carriage cover 101 and the limit plug 211 corresponds to the limit locking clamp assembly 1, and the first guide rail 212 has an end connected with the limit plug 211 so as to be limited; each lock bolt structure 22 includes a positioning block 221 and a lock bolt 222, the positioning block 221 is fixed at the first guide rail 212, the lock bolt 222 is slidably disposed at the positioning block 221, and the lock bolt 222 is able to move back and forth along the first guide rail 212 to be clamped into or disengaged from the limit step 121. The limit plug 211 corresponds to the limit locking clamp assembly 1 and the limit plug 211 is located above the limit locking clamp assembly 1 when the carriage cover 101 is mounted at the vehicle body, and the first guide rail 212 is disposed along a width or length direction of the carriage cover 101 and the first guide rail 212 has the end mounted at the limit plug 211, and the lock bolt 222 is slidably disposed at the first guide rail 212 through the positioning block 221, and the lock bolt 222 is able to be clamped into or disengaged from the limit step 121 through sliding the lock bolt 222, so that operation is easy.

A guide rail pressing edge 2122 is disposed at the first guide rail 212 to limit the lock bolt 222 at the first guide rail 212, and the lock bolt 222 is able to slide back and forth along the first guide rail 212.

The carriage cover 101 is provided with a carriage cover sideboard 1011, an H-shaped insertion groove is disposed at the carriage cover sideboard 1011, the limit plug 211 is provided with an H-shaped insertion end 2112, the H-shaped insertion end 2112 inserted into the H-shaped insertion groove, the limit plug 211 is fastened at the carriage cover sideboard 1011 through a fastening screw, and in this way, the limit plug 211 is fixed to the carriage cover sideboard 1011 more reliably, and the screw is not prone to getting loose.

The limit plug 211 is provided with a plurality of insertion ends 2111, an end of the first guide rail 212 is provided with a plurality of insertion holes 2121 corresponding to the insertion ends 2111, the insertion ends 2111 are inserted into the insertion holes 2121 to connect the limit plug 211 to the first guide rail 212, and in this way, the limit plug 211 and the first guide rail 212 are connected easily and it is convenient to assemble and disassemble.

The lock bolt 222 is provided with a lock block 224, a limit groove 2113 is defined by a plurality of insertion ends 2111, and when the lock bolt 222 is clamped into the limit step 121, the lock block 224 is inserted into the limit groove 2113. In one embodiment, the number of the insertion ends 2111 is three, and the three insertion ends 2111 are matched with the limit step 121 to define a rectangular limit groove 2113, and an upper face and the lower side face of the limit step 121 are cooperatively limited respectively through the lock block 224 and the lock bolt 222, so that the position of the carriage cover 101 in the vertical direction is better limited, and the limit locking clamp assembly 1 and the lock catch assembly 2 are connected more reliably.

Each lock bolt structure 22 further includes a spring 225, the lock bolt 222 is provided with a receiving groove 2221, the positioning block 221 is provided with a limit column 2211, the spring 225 is disposed into the receiving groove 2221 and the limit column 2211 is inserted into the spring 225. Two ends of the spring 225 respectively abut against the positioning block 221 and the lock bolt 222. When the lock bolt 222 is not stressed, the spring 225 is in a normal uncompressed state. When a force is applied to the lock bolt 222, the lock bolt 222 moves away from the limit locking clamp assembly 1, and the spring 225 is compressed. When the lock bolt 222 is aligned to the limit step 121, the force applied to the lock bolt 222 is eliminated, and the spring 225 restores and drives the lock bolt 222 to be clamped into the limit step 121.

A second guide rail 2222 is disposed at a side edge of the lock bolt 222, the positioning block 221 is provided with a C-shaped groove 2212 matched with the second guide rail 2222, and the second guide rail 2222 is able to slide in the C-shaped groove 2212 to allow the lock bolt 222 to be slidably disposed at the positioning block 221. Limit blocks 2226 protruding out of the second guide rail 2222 are disposed at two ends of the second guide rail 2222, so that a sliding distance of the lock bolt 222 is limited.

Each lock bolt structure 22 further includes a handle connection block 226, the handle connection block 226 is provided with a pull head 2261, the lock bolt 222 is provided with a slot 2223, and the pull head 2261 is clamped into the slot 2223 to connect the handle connection block 226 with the lock bolt 222. Handles 2224 are disposed at both of the handle connection block 226 and the lock bolt 222, so that a force can be conveniently applied by hand. When the carriage cover 101 is assembled or disassembled, a force is applied to the handles 2224 on the handle connection block 226 and the lock bolt 222 to enable the handle connection block 226 and the lock bolt 222 to slide along the first guide rail 212. The number of the lock tongue structures 22 is two, and the two lock bolt structures 22 respectively lock two sides of the carriage cover 101. The two lock bolt structures 22 are linked through a steel wire rope 23, and two ends of the steel wire rope 23 are respectively fixed to the two handle connection blocks 226. When a force is applied to the handles 2224 on the handle connection block 226 and the lock bolt 222 of one lock bolt structure 22, the handle connection block 226 and the lock bolt 222 move towards each other, so that the handle connection block 226 pulls the handle connection block 226 on the other lock bolt structure 22 through the steel wire rope 23, then the lock bolt 222 of the other lock bolt structure 22 is driven to move accordingly, and thus, two lock bolts 222 move towards each other; After the force is eliminated, the two lock bolts 222 move away from each other under a restoration effect of the springs 225, that is, the springs 225 in the two lock bolt structures 22 are synchronously compressed or restored to realize synchronous locking or unlocking.

The carriage is provided with a carriage sideboard 102. The limit locking clamp assembly 1 includes a first clamping plate 11, a second clamping plate 12, a first clamping member 13, and a second clamping member 14, wherein the first clamping plate 11 and the second clamping plate 12 are respectively fastened on two side faces of the carriage sideboard 102 through the first clamping member 13. The second clamping plate 12 is provided with a through hole, and the second clamping member 14 penetrates through the through hole and abuts against the first clamping plate 11 to fix the first clamping plate 11 and the second clamping plate 12 in the vertical direction. The limit step 121 is located at the second clamping plate 12. The first clamping plate 11 and the second clamping plate 12 are clamped at the carriage sideboard 102 through the first clamping member 13 to form a limit locking clamp to fix positions of the first clamping plate 11 and the second clamping plate 12 in the horizontal direction, the first clamping member 13 may be a screw, the first clamping plate 11 and the second clamping plate 12 are vertically fixed by the second clamping member 14, and the perpendicularity of the limit locking clamp is adjusted to make the first clamping plate 11 and the second clamping plate 12 in a fastened state, so that the first clamping plate 11 and the second clamping plate 12 will not get loose when the vehicle body shakes during traveling; and the second clamping member 14 may be a quincunx screw which is beneficial to subsequent adjustment.

Anti-slip teeth 123 are disposed at clamping faces of the first clamping plate 11 and the second clamping plate 12 and the clamping faces are in contact with the carriage sideboard 102, increasing the friction between the first clamping plate 11 and the carriage sideboard 102 as well as the friction between the second clamping plate 12 and the carriage sideboard 102, so that the limit locking clamp assembly 1 is not prone to getting loose.

The carriage sideboard 102 is provided with a first bent part 1021, the first bent part 1021 is bent upwards. The first clamping plate 11 is provided with a second bent part, and the second bent part is bent downwards. The first bent part 1021 is matched with the second bent part 111 to limit the first clamping plate 11 in the vertical direction. When the carriage cover 101 is clamped into the limit step 121 through the lock catch assembly 2, a force is applied to the limit locking clamp assembly 1 in the vertical direction, and the second bent part 111 hooks the first bent part 1021, so that the force borne by the limit locking clamp assembly 1 in the vertical direction is increased.

An arc-shaped guide face 2225 is disposed at an end of each lock bolt 222, the end of each lock bolt 222 is close to the limit step 121. An arc-shaped stop edge 1211 is disposed at an edge of the limit step 121, the edge of the limit step 121 is close to each lock bolt 222. The guide face 2225 is matched with the stop edge 1211 to clamp the lock bolt 222 into the limit step 121. When the carriage cover 101 is mounted, because the guide faces 2225 on the lock bolts 222 and the stop edge 1211 of the limit step 121 both are arc-shaped, the arc-shaped guide faces 2225 can partially convert a vertical pressing force generated by pressing the carriage cover 101 into a horizontal force to promote the lock bolts 222 to move away from the limit step 121, and then the guide faces 2225 are smoothly clamped into the limit step 121. When the lock bolts 222 are clamped into the limit step 121, the contact faces between the lock bolts 222 and the limit step 121 are planes, so that a contact area is large, the limit step 121 can be sustained, and the structure is more reliable.

The above embodiments are only preferred ones of the invention, and are not intended to limit the protection scope of the invention. All equivalent structural transformations achieved on the basis of the contents of the specification and accompanying drawings, and direct or indirect applications to other related technical fields should also fall within the protection scope of the invention.

What is claimed is:

1. A locking device for a carriage cover, used for mounting the carriage cover on a carriage of a vehicle body, wherein the locking device comprises:
    a limit locking clamp assembly, detachably disposed at the carriage of the vehicle body, wherein the limit locking clamp assembly is provided with a limit step, and a limit protrusion disposed at a lower surface of the limit step; and
    a lock catch assembly, disposed at the carriage cover, wherein the lock catch assembly is provided with a lock bolt, a limit groove is disposed at the lock bolt, wherein the lock bolt is clamped into the limit step, and the limit protrusion is clamped into the limit groove, so that the lock catch assembly and the limit locking clamp assembly are connected, and then the carriage cover is mounted at the carriage.

2. The locking device according to claim 1, wherein the lock catch assembly comprises:
    a guide rail structure comprising a limit plug and a first guide rail, wherein the limit plug is disposed at the carriage cover and the limit plug corresponds to the limit locking clamp assembly, and the first guide rail has an end connected with the limit plug so as to be limited; and
    lock bolt structures, wherein each lock bolt structure comprises a positioning block and the lock bolt, the positioning block is fixed at the first guide rail, the lock bolt is slidably disposed at the positioning block, and the lock bolt is able to move back and forth along the first guide rail to be clamped into or disengaged from the limit step.

3. The locking device according to claim 2, wherein the limit plug is provided with a plurality of insertion ends, an end of the first guide rail is provided with a plurality of insertion holes corresponding to the insertion ends, the insertion ends are inserted into the insertion holes to connect the limit plug with the first guide rail, the carriage cover is provided with a carriage cover sideboard, an H-shaped insertion groove is disposed at the carriage cover sideboard, the limit plug is provided with an H-shaped insertion end, the H-shaped insertion end inserted into the H-shaped insertion groove, the lock bolt is provided with a lock block, a limit groove is defined by a plurality of insertion ends, and when the lock bolt is clamped into the limit step, the lock block is inserted into the limit groove.

4. The locking device according to claim 2, wherein each lock bolt structure further comprises a spring, the lock bolt is provided with a receiving groove, the positioning block is provided with a limit column, the spring is disposed into the receiving groove and the limit column is inserted into the spring, two ends of the spring respectively abut against the positioning block and the lock bolt, a second guide rail is disposed at a side edge of the lock bolt, the positioning block is provided with a C-shaped groove matched with the second guide rail, and the second guide rail is able to slide in the C-shaped groove to allow the lock bolt to be slidably disposed at the positioning block.

5. The locking device according to claim 2, wherein each lock bolt structure further comprises a handle connection block, the handle connection block is provided with a pull head, the lock bolt is provided with a slot, and the pull head is clamped into the slot to connect the handle connection block with the lock bolt, handles are disposed at both of the handle connection block and the lock bolt, so that a force can be conveniently applied by hand.

6. The locking device according to claim 5, wherein the number of the lock bolt structures is two, the two lock bolt structures respectively lock two sides of the carriage cover, the two lock bolt structures are linked through a steel wire rope, and two ends of the steel wire rope are respectively fixed to the two handle connection blocks.

7. The locking device according to claim 1, wherein the carriage is provided with a carriage sideboard, the limit locking clamp assembly comprises a first clamping plate, a second clamping plate, a first clamping member, and a second clamping member, wherein the first clamping plate and the second clamping plate are respectively fastened on two side faces of the carriage sideboard through the first clamping member, the second clamping plate is provided with a through hole, the second clamping member penetrates through the through hole and abuts against the first clamping plate so as to fix the first clamping plate and the second clamping plate in a vertical direction, and the limit step is located at the second clamping plate.

8. The locking device according to claim 7, wherein anti-slip teeth are disposed at clamping faces of the first clamping plate and the second clamping plate and the clamping faces are in contact with the carriage sideboard.

9. The locking device according to claim 7, wherein the carriage sideboard is provided with a first bent part bent upwards, the first clamping plate is provided with a second bent part bent downwards, and the first bent part is matched with the second bent part to limit the first clamping plate in the vertical direction.

10. The locking device according to claim 1, wherein an arc-shaped guide face is disposed at an end of each lock bolt, the end of each lock bolt is close to the limit step, an arc-shaped stop edge is disposed at an edge of the limit step, the edge of the limit step is close to each lock bolt, and the guide face is matched with the stop edge to clamp the lock bolt into the limit step.

* * * * *